3,056,825
THIOPHOSPHORIC ACID ESTERS AND A PROCESS FOR THEIR PRODUCTION
Ernst Schegk, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Feb. 3, 1959, Ser. No. 790,817
Claims priority, application Germany Feb. 12, 1958
9 Claims. (Cl. 260—461)

The present invention relates to and has as its objects new and useful O.O-dialkylthiol- or -thionothiolphosphoric acid esters or O-alkylthiol- or -thionothiolphosphonic acid esters, the thiol groups of which carry a further alkoxyphenyl, alkylmercaptophenyl, alkylsulfoxylphenyl or alkylsulfonylphenyl radical. These excellent pest control agents may be represented by the following formula

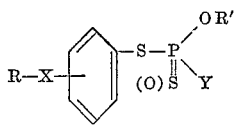

in which R and R' denote a preferred lower alkyl radical, X stands for oxygen, sulfur, the sulfoxyl group SO or the sulfonyl group $SO_2$, Y may also be $OR_1$ or may denote the radical of an organic phosphonic acid.

These compounds are obtainable for example by reacting the corresponding thiophenols with the corresponding O.O-dialkylphosphoric- or -thionophosphoric acid chlorides or with the corresponding O-alkylphosphonic or -thionophosphonic acid chlorides. The following reaction scheme may illustrate the reaction:

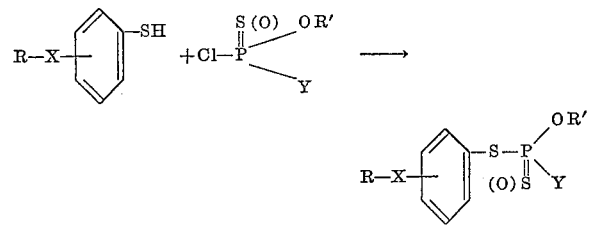

In these formula the symbols have the same significance as shown above.

In another way the compounds according to the invention may also be obtained from the corresponding aromatic sulfenic acid chlorides (which are readily obtainable from the corresponding disulfides) and from the corresponding O.O-dialkylphosphites or -thiolphosphites or from the corresponding phosphonites. This reaction may be illustrated by the following equation

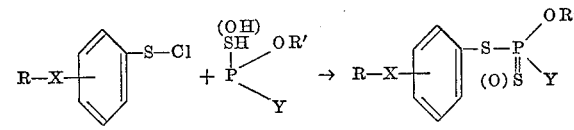

wherein the symbols have the same significance as shown above.

If sulfoxyl or sulfonyl compounds are to be obtained, the mercapto-esters according to the invention may be further oxidized in a manner known as such to give sulfoxides and sulfones.

As examples for the compounds which are obtainable according to the above described reactions there may be mentioned the compounds of the following formula

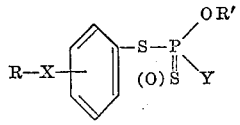

in which the group R—X— stands for methoxy, ethoxy, propoxy, methyl mercapto, ethyl mercapto, propyl mercapto, butyl mercapto, cyclohexyl mercapto, phenyl mercapto, and the like; methyl sulfoxyl, ethyl sulfoxyl, propyl sulfoxyl, phenyl sulfoxyl, and the like; as well as the corresponding sulfonyl groups. R—X— may furthermore stand in o-, m- or p-position. The benzene nucleus may furthermore be substituted by other groups such as methyl, ethyl, propyl, chlorine, bromine, methoxy, ethoxy, acetoxy, and the like. The ester radical R' preferably is a lower alkyl group up to 4 carbon atoms. The group Y either is the same as OR' or may also be methyl, ethyl, propyl, butyl, cyclohexyl, phenyl, tolyl, chloro-substituted phenyl, alkoxy-substituted vinyl, and the like.

Some thiono compounds which are analogous or isomeric to the new phosphoric or phosphonic acid esters according to the invention are already known from U.S. patent applications Serial No. 645,664, now abandoned and Serial No. 678,031, now U.S. Patent No. 2,916,509. In comparison, however, with these analogous or isomeric compounds, the new phosphoric or phosphonic acid esters are distinguished by a better activity against some specified species of insects.

The new compounds according to the invention are employed in a manner commonly used for other phosphoric acid insecticides, i.e. preferably in combination with suitable solid or fluid carriers or diluents. Solid carriers are mainly talcum, chalk, bentonite, charcoal and the like. As liquid diluent water is chiefly used in combination with suitable solvents such as acetone or dimethyl formamide, and with the use of suitable emulsifiers, preferably those having neutral reaction and based on polyglycol ethers.

The compounds according to the invention are effective against a great number of insect pests such as mites, aphids or flies. Some of them are also effective against eating insects such as caterpillars. Some of the compounds according to the invention also possess a distinct systemic action.

As an example for the special utility of the inventive compounds the compounds of the following formulae (I)
(II)

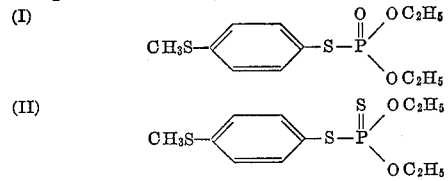

have been tested against spider mites (species *Ietranychus telarius*) and caterpillars (*Plutella maculipennis*). Aqueous solutions have been prepared by admixing the above shown compounds with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against spider mites (species *Tetranychus telarius*). Bean plants (*Phaseolus vulgaris*) of about 15 inches height are sprayed drip wet with aqueous solutions of the above shown active ingredients prepared as indicated above. The bean plants have been infested heavily with the two-spotted spider (species *Tetranychus telarius*). Evaluation has been carried out after 24 hours, 48 hours and 8 days. The following results have been obtained:

| Compound | Aqueous concentration (in % active ingredient/water) | Killing rate (in %) |
|---|---|---|
| I) | 0.001% | 100% |
| II) | 0.001% | 100% |

(b) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status of the caterpillars has been determined after 24 hours and 48 hours. The following results have been obtained:

| Compound | Aqueous concentration (in % active ingredient/water) | Killing rate (in %) |
|---|---|---|
| I) | 0.1% | 100% |
| II) | 0.1% | 100% |

The following examples are given for the purpose of illustrating the present invention, without, however, limiting it thereto.

*Example 1*

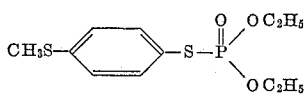

31 grams (0.1 mol) of p.p'-methylmercapto-diphenyl-disulfide (M.P. 91° C.) are dissolved in 150 ccm. of methylene chloride, and 7.1 grams (0.1 mol) of chlorine are introduced. The temperature is maintained at 0° C. Into the so-formed dark red solution of 38.1 grams (0.2 mol) of p-methylmercapto-phenylsulfenyl chloride there are added dropwise at 20° C. 35 grams (0.25 mol) of O.O-diethyl phosphite. After completion of the reaction, the mixture is heated to the boil for a further 1 hour. The reaction product is then cooled, washed with a solution of bicarbonate and water, and the separated solution is dried over anhydrous sodium sulfate. After the solvent is distilled off, 58 grams of the new ester are obtained in the form of a pale yellow oil which is distilled at 160° C./0.03 mm. Hg. The yield is 99% of the theoretical.

The ester has a $LD_{95}$ of 25 mg./kg. on rats per os. Spider mites are completely killed with 0.001% solutions. Caterpillars are completely destroyed with 0.1% solutions.

By the same way but using instead of p-methyl-mercapto-phenylsulfenyl chloride the corresponding m-methylmercapto-phenylsulfenyl chloride in equimolecular amounts there is obtained the ester of the following formula

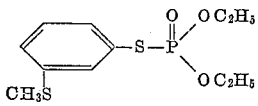

By oxidation of the phosphoric acid ester shown at the top of this example according to the data given in U.S. patent application Serial No. 645,664 the corresponding sulfoxyl or sulfonyl esters of the following formulae can be obtained:

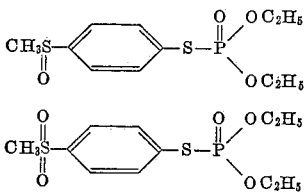

*Example 2*

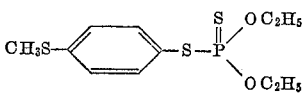

According to the description given in Example 1 there is added dropwise at 20° C. to a solution of 38.1 grams (0.2 mol) of p-methylmercaptophenyl-sulfenyl chloride in 150 ccm. of methylene chloride. 38 grams (0.25 mol) of O.O-diethyl-thiolphosphite and the mixture is heated to 40° C. for a further 1 hour after completion of the reaction. The product is worked up as described in Example 1. After distillation in a high vacuum, 35 grams of the new ester are obtained in the form of a pale yellow oil of B.P. 140° C./0.02 mm. Hg. Yield: 57% of the theoretical.

The ester shows a $LD_{95}$ of 50 mg./kg. on rats per os. Aphids are killed to 100% with 0.01% solutions. Spider mites are killed with certainty by 0.001% solutions. The ester has a distinct ovicidal action on eggs of the red spider. Eating insects such as caterpillars are completely killed with 0.1% solutions.

By oxidation of the aforesaid phosphoric acid ester according to the data given in U.S. patent application Ser. No. 645,664 the corresponding sulfoxyl or sulfonyl esters of the following formulae can be obtained:

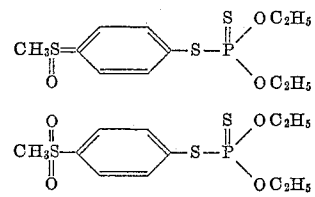

*Example 3*

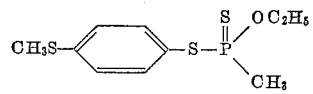

34.5 grams (0.22 mol) of p-methylmercapto-thiophenol (B.P. 67° C./0.01 mm. Hg) are dissolved in 100 ccm. of methanol. A sodium methylate solution containing dissolved 0.22 mol of sodium is added with stirring. Stirring is continued at room temperature for half hour and there is then added dropwise at 0—+5° C. to the solution thus obtained 40 grams (0.25 mol) of O-ethyl-methyl-thionophosphonic acid chloride (B.P. 61° C./12 mm. Hg). To complete the reaction, the solution is heated to the boil on a water bath for 1 hour. It is then cooled to room temperature, diluted with 100 ccm. of chloroform, and the separated common salt is filtered off with suction. The filtrate is washed several times with water. The residual chloroform solution is dried over sodium sulfate. The solvent is subsequently removed in vacuum. 61 grams of the new ester of B.P. 147° C./0.01 mm. Hg are obtained by fractionating. Yield: 99% of the theoretical. The ester has on rats per os a $LD_{95}$ of 10 mg./kg.

By the same way but using instead of p-methyl-mercapto-thiophenol the exact equimolecular amount of O-ethylmercapto-thiophenol there is obtained the ester of the following formula

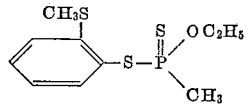

and if instead of O-ethyl-methyl-thionophosphonic acid chloride the equimolecular amount of O-ethyl-phenyl-thionophosphonic acid chloride is used there is obtained the ester of the following formula

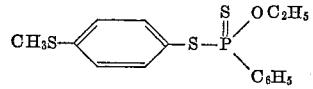

By oxidation of the phosphoric acid ester shown at the top of this example according to the data given in U.S. patent application Serial No. 678,031 the corresponding sulfoxyl or sulfonyl ester of the following formulae can be obtained:

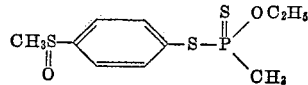

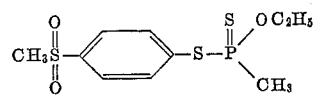

*Example 4*

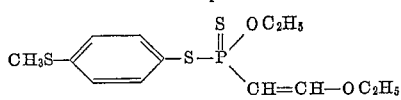

34.5 grams (0.2 mol) of p-methylmercapto-thiophenol are dissolved in 100 ccm. of methanol and treated with stirring with a sodium methylate solution containing dissolved 0.2 mol of sodium. As described in Example 3 there are added dropwise at 0—+5° C. with further stirring 50 grams (0.23 mol) of O-ethyl-β-ethoxyvinyl-thionophosphonic acid ester chloride of B.P. 60° C./0.01 mm. Hg. After completion of the reaction, the reaction product is heated to the boil for one hour and finally worked up in the manner described in Example 3. 63 grams of the new ester are obtained in the form of a pale yellow, water-insoluble oil. Yield: 94% of the theoretical. The new ester shows a $LD_{95}$ of 10 mg./kg. on rats per os.

By oxidation of the aforesaid phosphonic acid ester according to the data given in U.S. pat. appl. Serial No. 645,664 the corresponding sulfoxyl or sulfonyl esters of the following formulae may be obtained:

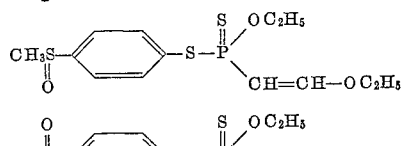

*Example 5*

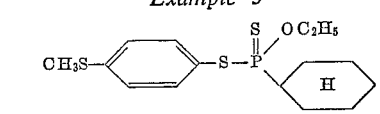

34.5 grams of p-methylmercapto-thiophenol are dissolved in 100 ccm. of methanol and treated with stirring with a sodium methylate solution containing dissolved 0.2 mol of sodium. At +5° C. there is added dropwise with further stirring 46 grams (0.2 mol) of cyclohexyl-thionophosphonic acid ethyl ester chloride (B.P. 54° C./0.01 mm. Hg). After the reaction is completed, the mixture is heated to the boil for one hour. After working up in conventional manner, 67 grams of the new ester are obtained in the form of a pale yellow, water-insoluble oil. Yield: 97% of the theoretical. $LD_{95}$ 250 mg./kg. on rats per os.

By oxidation of the aforesaid phosphonic acid ester according to the data given in U.S. pat. appl. Serial No. 645,664 the corresponding sulfoxyl or sulfonyl ester of the following formulae may be obtained:

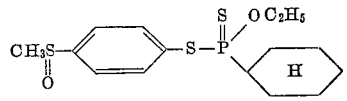

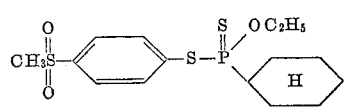

*Example 6*

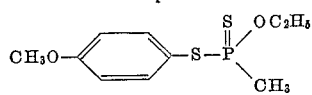

To a solution of 28 grams (0.2 mol) of 1-methoxy-4-thiophenol (B.P. 42° C./0.01 mm. Hg) in 150 ccm. of absolute alcohol, there is added with stirring a sodium-ethylate solution containing dissolved 0.2 mol of sodium. 36 grams (0.2 mol) of methyl-thionophosphonic acid ethyl ester chloride (B.P. 61° C./12 mm. Hg) are then added dropwise with stirring at 0—+5° C. After the reaction is completed, the mixture is heated to the boil for one hour. After working up in conventional manner, 26 grams of the new ester boiling at 111° C. and under a pressure of 0.01 mm. Hg are thus obtained. Yield: 50% of the theoretical. The new ester is a pale yellow, water-insoluble oil.

If instead of 1-methoxy-4-thiophenol and methylthionophosphonic acid ethyl ester chloride there are reacted by the same way as described above corresponding molecular amounts of 1-ethoxy-2-thiophenol and ethyl-thionophosphonic acid methyl ester chloride there is obtained the compound of the following formula

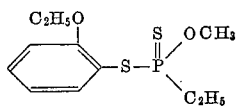

*Example 7*

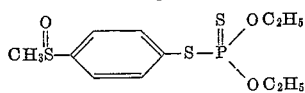

36 grams (0.113 mol) of O.O-diethyl-p-methylmercapto-thiophenyl-thiophosphoric acid ester (B.P. 135° C./0.01 mm. Hg) are dissolved in 150 ccm. of methanol and acidified with a few drops of 50% sulfuric acid. To this solution there are added dropwise at 20° C. 11.5 ccm. (0.113 mol) of 35% hydrogen peroxide, the solution is allowed to stand for a few hours at room temperature and then neutralized with in vacuum calcium carbonate. The solvent is carefully removed from the filtered solution. The residue is kept for a short time at a bath temperature of 50° C. and a pressure of 0.01 mm. Hg. 35.5 grams of the new ester are thus obtained in the form of a pale yellow water-insoluble oil. Yield: 97% of the theoretical. The toxicity $LD_{50}$ is 10 mg./kg. on rats per os.

*Example 8*

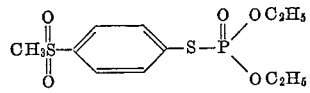

To a suspension of 24 grams of potassium permanganate and 23 grams of magnesium sulfate in 100 ccm. of water and 100 ccm. of acetone there is added dropwise at a temperature of 30–40° C. a solution of 31.5 grams (0.108 mol) of O.O-diethyl-p-methylmercapto-thiophenyl-phosphoric acid ester (B.P. 117° C./0.01 mm. Hg). After the reaction is completed, sulfur dioxide is introduced until the manganese dioxide is dissolved. The so-formed ester is extracted from the reaction mixture with methylene chloride and the solution dried over sodium sulfate. After the solvent is distilled off in vacuum the residue is kept for a short time at a bath temperature of 100° C. and under a pressure of 1 mm. Hg. 31 grams of the new ester are obtained in the form of a pale yellow, water-insoluble oil. Yield: 88.5% of the theoretical.

We claim:
1. Thiophosphoric acid esters of the following general formula

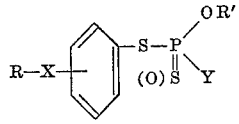

in which R and R' stand for a lower alkyl radical up to 4 carbon atoms, X stands for a member selected from the group consisting of sulfur and sulfoxide, and Y stands for a member selected from the group consisting of OR', a lower alkyl group up to 4 carbon atoms, the cyclohexyl group, the phenyl group and a lower alkoxy-substituted vinyl group.

2. The thiophosphoric acid ester of the following formula

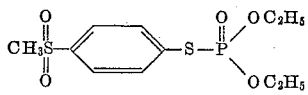

3. The thiophosphoric acid ester of the following formula

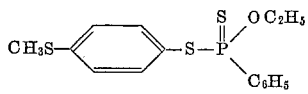

4. A thiophosphoric acid ester of the following formula

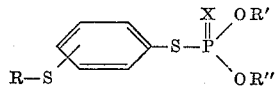

wherein R, R', and R'' are each lower alkyl having up to 4 carbon atoms and X is a chalcogen having an atomic number from 8 through 16.

5. A thiophosphoric acid ester of the following formula

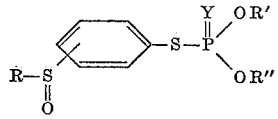

wherein R, R', and R'' are each lower alkyl having up to 4 carbon atoms and Y is a chalcogen having an atomic number from 8 through 16.

6. A thiophosphonic acid ester of the following formula

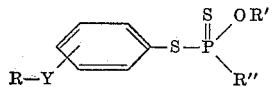

wherein R, R', and R'' are each lower alkyl having up to 4 carbon atoms and Y is a chalcogen having an atomic number from 8 through 16.

7. A thiophosphonic acid ester of the following formula

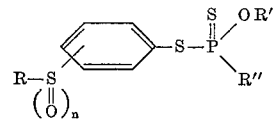

wherein R, R', and R'' are each lower alkyl having up to 4 carbon atoms and $n$ is an integer from 1 through 2.

8. A thiophosphonic acid ester of the following formula

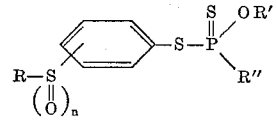

wherein R and R' are each lower alkyl having up to 4 carbon atoms, R'' is lower alkoxy-substituted-vinyl and $n$ is a whole number from 0 through 2.

9. A thiophosphonic acid ester of the following formula

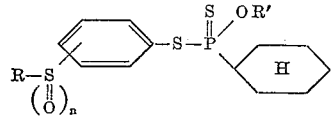

wherein R and R' are each lower alkyl having up to 4 carbon atoms, and $n$ is a whole number from 0 through 2.

References Cited in the file of this patent

UNITED STATES PATENTS 2,803,580     Metivier _____ Aug. 20, 1957

OTHER REFERENCES

Galashina et al.: J. Gen. Chem. U.S.S.R. 23, 1613–1615 (1953), English translation.